US011729021B2

(12) United States Patent
Mutter et al.

(10) Patent No.: US 11,729,021 B2
(45) Date of Patent: Aug. 15, 2023

(54) USER STATION FOR A SERIAL BUS SYSTEM AND METHOD FOR COMMUNICATION IN A SERIAL BUS SYSTEM

(71) Applicant: Robert Bosch GmbH, Stuttgart (DE)

(72) Inventors: Arthur Mutter, Neuhausen (DE); Florian Hartwich, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 86 days.

(21) Appl. No.: 17/426,434

(22) PCT Filed: Jan. 29, 2020

(86) PCT No.: PCT/EP2020/052079
§ 371 (c)(1),
(2) Date: Jul. 28, 2021

(87) PCT Pub. No.: WO2020/157086
PCT Pub. Date: Aug. 6, 2020

(65) Prior Publication Data
US 2021/0392011 A1    Dec. 16, 2021

(30) Foreign Application Priority Data
Feb. 1, 2019  (DE) .......................... 102019201316.3

(51) Int. Cl.
*H04L 12/40*        (2006.01)
(52) U.S. Cl.
CPC .... *H04L 12/4013* (2013.01); *H04L 12/40013* (2013.01); *H04L 12/40032* (2013.01); *H04L 12/40163* (2013.01); *H04L 12/40169* (2013.01)

(58) Field of Classification Search
CPC ........... H04L 12/4013; H04L 12/40013; H04L 12/40032; H04L 12/40163;
(Continued)

(56) References Cited

U.S. PATENT DOCUMENTS 6,728,892 B1    4/2004  Silvkoff et al.
2006/0268855 A1  11/2006  Brandt et al.
(Continued)

FOREIGN PATENT DOCUMENTS

EP         2712123 A1    3/2014

OTHER PUBLICATIONS

International Search Report for PCT/EP2020/052079, dated Apr. 7, 2020.
(Continued)

*Primary Examiner* — Luat Phung
(74) *Attorney, Agent, or Firm* — Norton Rose Fulbright US LLP; Gerard Messina

(57) ABSTRACT

A user station for a serial bus system and a method for communication in a serial bus system. The user station includes a communication control unit, and a transceiver unit for transmitting a transmit signal for a message which is exchanged between user stations of the bus system. The bit time of a signal transmitted in the first communication phase on the bus differs from a bit time of a signal transmitted in the second communication phase. The communication control unit generates the transmit signal according to a frame, in which in addition to a field which indicates the priority of the message, a field for a data type is provided, and the communication control unit being designed to write a value in the field for the data type which indicates which type of information is located in a data field of the frame.

15 Claims, 9 Drawing Sheets

(58) Field of Classification Search
CPC ......... H04L 12/40169; H04L 12/40143; H04L 2012/40215
See application file for complete search history.

(56) References Cited

U.S. PATENT DOCUMENTS

| | | | |
|---|---|---|---|
| 2010/0158045 A1 | 6/2010 | Shin et al. | |
| 2019/0228236 A1* | 7/2019 | Schlicht | ............... H04L 67/565 |
| 2019/0372803 A1* | 12/2019 | Bölter | ............... H04L 12/40039 |
| 2022/0191059 A1* | 6/2022 | Ren | ................... H04L 12/40169 |

OTHER PUBLICATIONS

Robert Bosch Gmbh, "Can With Flexible Data-Rate," White Paper, Version 1.1, Robert Bosch GMBH, Jan. 16, 2011.
ISO 11898-1:2003 Standard, "Road Vehicles—Controller Area Network (CAN), Part 1: Data Link Layer and Physical Signalling," ISO11898-1:2003, IEEE-SA, 2003, pp. 1-52.
ISO/TC 22/SC 3, "Draft International Standard ISO/DIS 15765-2.2 (15765-2.4): Road Vehicles—Diagnostics on Controller Area Networks (CAN)—Part 2: Network Layer Services," Draft International Standard ISO/DIS, 2003, pp. I-VI, 1.
Robert Bosch Gmbh, "Can With Flexible Data-Rate Specification Version 1.0," Robert Bosch GMBH, 2012, pp. 1-34.
ISO 11898-1:2015 Road Vehicles—Controller area network (CAN)—Part 1: Data Link Layer and Physical Signalling. 74 Pages.

* cited by examiner

USER STATION FOR A SERIAL BUS SYSTEM AND METHOD FOR COMMUNICATION IN A SERIAL BUS SYSTEM

FIELD

The present invention relates to a user station for a serial bus system and a method for communication in a serial bus system, using which in addition to data transport alone, other functions are also assisted, such as safety (functional safety), security (data security), and QoS (quality of service, for example guarantee of a maximum latency for a frame, time synchronization of the user stations (nodes) in the bus system).

BACKGROUND INFORMATION

For communication between sensors and control units, for example in vehicles, for reasons of cost, instead of a point-to-point connection, a bus system is presently being used more and more frequently, in which data are transferred as messages in the standard ISO 11898-1:2015 as the CAN protocol specification using CAN FD. The messages are transferred between the user stations of the bus system, such as sensor, control unit, encoder, etc. CAN FD is usually presently used in the vehicle in the introduction phase in the first step at a data bit rate of 2 Mb/s in the transfer of bits of the data field and at a transfer bit rate of 500 kb/s in the transfer of bits in the arbitration field.

More and more pieces of information are exchanged via such a bus system. In particular, in addition to data transport alone, other functions are also to be assisted, such as safety (functional safety), security (data security), and QoS (quality of service, for example guarantee of a maximum latency for a frame, time synchronization of the user stations (nodes) in the bus system). The user nonetheless has the wish to increase the data rate in the bus system further to at least maintain the speed of the data transfer in the bus system and if possible to increase it still further.

For this purpose, it is possible to communicate to the reception node which information is in a frame transmitted via the bus. In classic CAN and CAN FD, the content of a frame is communicated via a frame identifier (ID), which is also used for the arbitration. This functions in principle, because each user station (node) transmits frames having exclusive frame identifiers. This corresponds to a flat association of frame identifier and content. However, such an association does not scale well and is not flexible enough.

SUMMARY

It is an object of the present invention to provide a user station for a serial bus system and a method for communication in a serial bus system which solve the above-mentioned problems. In particular, a user station for a serial bus system and a method for communication in a serial bus system are to be provided, with which a high data rate and an increase of the amount of the useful data per frame may be implemented with great flexibility and with great error tolerance of the communication.

The object may be achieved by a user station for a serial bus system in accordance with an example embodiment of the present invention. In accordance with an example embodiment of the present invention, the user station has a communication control unit for controlling a communication of the user station with at least one other user station of the bus system, and a transceiver unit for transmitting a transmit signal generated by the communication control unit onto a bus of the bus system, for a message which is exchanged between user stations of the bus system, the bit time of a signal transmitted in the first communication phase onto the bus differing from a bit time of a signal transmitted in the second communication phase, the communication control unit being designed to generate the transmit signal according to a frame in which in addition to a field which indicates the priority of the message, a field for a data type is provided, and the communication control unit being designed to write a value in the field for the data type which indicates which type of information is in a data field of the frame.

Due to the design of the user station in accordance with an example embodiment of the present invention, an abstraction level is incorporated in the communication protocol in a frame which is transferred on the bus to exchange messages between the user stations of the bus system. The following two things are thus separated from one another, namely:

data transport or data transfer on the bus, including transmitting frames, error handling, etc.

auxiliary functions such as safety (functional safety), security (data security), and QoS (quality of service, for example guarantee of a maximum latency for a frame, time synchronization of the user stations (nodes) in the bus system, etc.).

The communication protocol used by the user station for the bus system, which may be, for example, a successor communication protocol to CAN FD, in particular a CAN FX SCAN XL) protocol, is thus simpler to understand and therefore more functionally reliable. Moreover, the communication protocol thus becomes modular and therefore easily expandable for the future to insert additional functions, without having to change the frame format. New auxiliary functions may be added in old implementations with the aid of software, so that the various implementations remain compatible. The communication protocol used for the bus system is therefore also very flexibly expandable.

In accordance with an example embodiment of the present invention, the design of the user station additionally enables the type of the transferred information to be communicated in a small field in the frame. The protocol thus remains unchanged for all types of the information. The frame format thus does not change due to the type of the information, so that it is not necessary for a communication control unit of each user station to be able to process various types of frame formats in hardware, because there is only one frame format.

As a result, transmitting and receiving of the frame with great flexibility with regard to new auxiliary functions of the bus system and with lower error rate may be ensured using the user station even upon increase of the data rate.

It is possible in particular here using the user station in the bus system to maintain an arbitration known from CAN in a first communication phase and nonetheless once again significantly increase the transfer rate in relation to CAN or CAN FD.

In accordance with an example embodiment of the present invention, the method carried out by the user station may also be used if at least one CAN user station and/or at least one CAN FD user station is present in the bus system, which transmit messages according to the CAN protocol and/or CAN FD protocol.

Advantageous further designs and embodiments of the user station are disclosed herein.

According to one variant of the present invention, the communication control unit is designed to provide the field for the data type prior to or after a field for the data length code of the data field.

According to one special embodiment variant of the present invention, the communication control unit is designed to provide the field for the data type in the transmit signal in a first and/or second byte of the data field.

According to one exemplary embodiment of the present invention, the communication control unit is designed, in the case of a predetermined value in the field for the data type, to additionally provide at least one field for a data type in the data field and to write a value in this field in the data field which indicates which type of information is in the data field of the frame. In this case, the predetermined value in the field for the data type may indicate that the useful data are divided into multiple frames and a header is placed before the additional field for a data type in the data field, whose value indicates the serial number of the frames and the total number of the frames into which the useful data are divided.

The type of information possibly includes that the useful data include raw data, or that the useful data include an Ethernet frame, or that the useful data include a packet of an Internet protocol, or that at least a part of the frame is secured using crypto mechanisms, or that the useful data include data for negotiating a predetermined parameter for communication in the bus system, or that the useful data include data for the time synchronization, or that the useful data include a message identifier, or that the useful data include specifications on the source and on the destination of the message.

At least one predetermined value for a data type is optionally exclusively available to the communication control unit, which may not be transmitted by other units of the user station.

In accordance with an example embodiment of the present invention, the user station may additionally include a protocol expansion block for evaluating the field for the data type and the optionally provided additional field for a data type in the useful data and for executing the required handling of the message on the basis of an evaluation result. The protocol expansion block may include at least one module here, which executes the evaluation and the execution of the required handling of the message. Alternatively or additionally, the evaluation and/or the execution of the required handling of the message is/are executable with the aid of hardware. Alternatively or additionally, the evaluation and/or the execution of the required handling of the message is/are executable with the aid of software, which runs on a microcontroller of the user station.

It is possible that the frame formed for the message is constructed to be compatible with CAN FD.

It is possible that it is negotiated in the first communication phase which of the user stations of the bus system receives an at least temporary exclusive, collision-free access to the bus in the following second communication phase.

The above-described user station may be part of a bus system which moreover includes a bus and at least two user stations which are connected to one another via the bus in such a way that they may serially communicate with one another. At least one of the at least two user stations is an above-described user station.

The above-mentioned object may moreover be achieved by a method for communication in a serial bus system in accordance with an example embodiment of the present invention. In accordance with an example embodiment of the present invention, the method is carried out by a user station of the bus system, which includes a communication control unit and a transceiver unit, the method having the steps of controlling, using the communication control unit, a communication of the user station with at least one other user station of the bus system and transmitting, using the transceiver unit, a transmit signal generated by the communication control unit on a bus of the bus system, for a message which is exchanged between user stations of the bus system, the bit time of a signal transmitted in the first communication phase on the bus differing from a bit time of a signal transmitted in the second communication phase, the communication control unit generating the transmit signal according to a frame in which, in addition to a field which indicates the priority of the message, a field for a data type is provided, and the communication control unit writing a value in the field for the data type which indicates which type of information is in a data field of the frame.

The method offers the same advantages as mentioned above with reference to the user station.

Further possible implementations of the present invention also include combinations which were not explicitly mentioned of features or embodiments described above or hereinafter with respect to the exemplary embodiments. Those skilled in the art will also add individual aspects as improvements or additions to the particular basic form of the present invention, in view of the disclosure herein.

BRIEF DESCRIPTION OF THE DRAWINGS

The present invention is described in more detail hereinafter with reference to the figures and on the basis of exemplary embodiments.

In the figures, identical or functionally identical elements are provided with the same reference numerals if not indicated otherwise.

DETAILED DESCRIPTION OF EXAMPLE EMBODIMENTS

Figure 1:
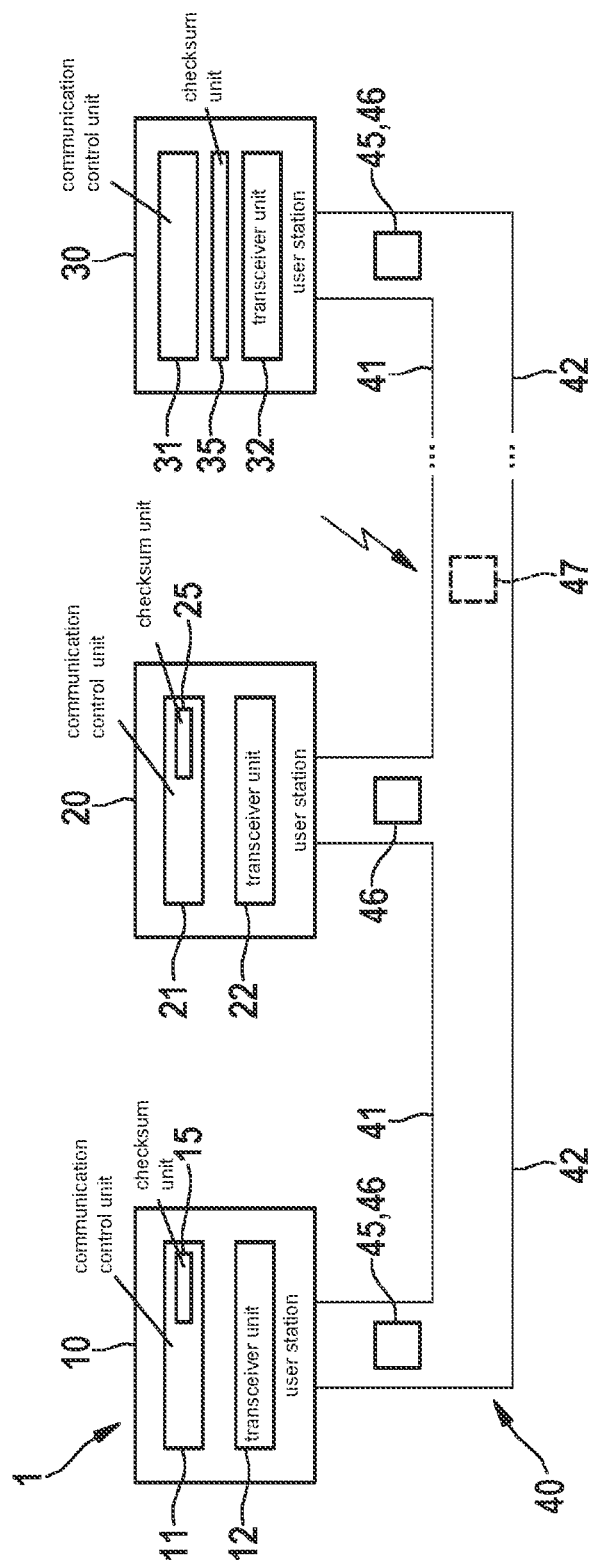
FIG. 1 shows a simplified block diagram of a bus system according to a first exemplary embodiment of the present invention.

FIG. 1 shows as an example a bus system 1, which is designed in particular as the foundation for a CAN bus system, a CAN FD bus system, a CAN FX bus system, and/or modifications thereof, as described hereinafter. Bus system 1 may be used in a vehicle, in particular a motor vehicle, an aircraft, etc., or in a hospital, etc.

In FIG. 1, bus system 1 includes a plurality of user stations 10, 20, 30, which are each connected to a bus 40 having a first bus wire 41 and a second bus wire 42. Bus wires 41, 42 may also be called CAN H and CAN L or CAN-FX H and CAN-FX L and are used for electrical signal transmission after coupling in the dominant level or generating recessive levels for a signal in the transmit state. Messages 45, 46 are serially transmittable in the form of signals between individual user stations 10, 20, 30 via bus 40. If an error occurs during the communication on bus 40, as shown by the serrated black block arrow in FIG. 1, an error frame 47 (error flag) may optionally be transmitted. User stations 10, 20, 30 are, for example, control units, sensors, display devices, etc. of a motor vehicle.

As shown in FIG. 1, user station 10 includes a communication control unit 11, a transceiver unit 12, and a checksum unit 15. User station 20 includes a communication control unit 21, a transceiver unit 22, and a checksum unit 25. User station 30 includes a communication control unit 31, a transceiver unit 32, and a checksum unit 35. Transceiver units 12, 22, 32 of user stations 10, 20, 30 are each directly connected to bus 40, even if this is not shown in FIG. 1.

Communication control units 11, 21, 31 are each used to control a communication of the particular user station 10, 20, 30 via bus 40 with at least one other user station of user stations 10, 20, 30, which are connected to bus 40.

Communication control units 11, 31 create and read first messages 45, which are modified CAN messages 45, for example. Modified CAN messages 45 are constructed on the basis of a CAN FX format, which is described in more detail with reference to FIG. 2, and in which particular checksum unit 15, 35 is used.

Communication control units 11, 31 may moreover be designed to provide a CAN FX message 45 or a CAN FD message 46 for transceiver units 12, 32 or receive messages from it as needed. Particular checksum units 15, 35 are also used here. Communication control units 11, 31 thus create and read a first message 45 or second message 46, first and second message 45, 46 differing due to their data transfer standard, namely in this case CAN FX or CAN FD.

Communication control unit 21 may be designed like a conventional CAN controller according to ISO 11898-1: 2015, i.e., like a CAN-FD-tolerant classic CAN CAN controller or a CAN FD controller. Communication control unit 21 creates and reads second messages 46, for example CAN FD messages 46. CAN FD messages 46 may include a number of 0 to 64 data bytes, which are additionally also transferred at a significantly faster data rate than in the case of a classic CAN message. In particular, communication control unit 21 is designed like a conventional CAN FD controller.

Transceiver unit 22 may be designed like a conventional CAN transceiver according to ISO 11898-1:2015 or CAN FD transceiver. Transceiver units 12, 32 may be designed to provide messages 45 according to the CAN FX format or messages 46 according to the present CAN FD format for associated communication control unit 11, 31 or receive messages from it as needed.

A formation and then a transfer of messages 45 using the CAN FX format and the reception of such messages 45 is implementable using the two user stations 10, 30.

Figure 2:
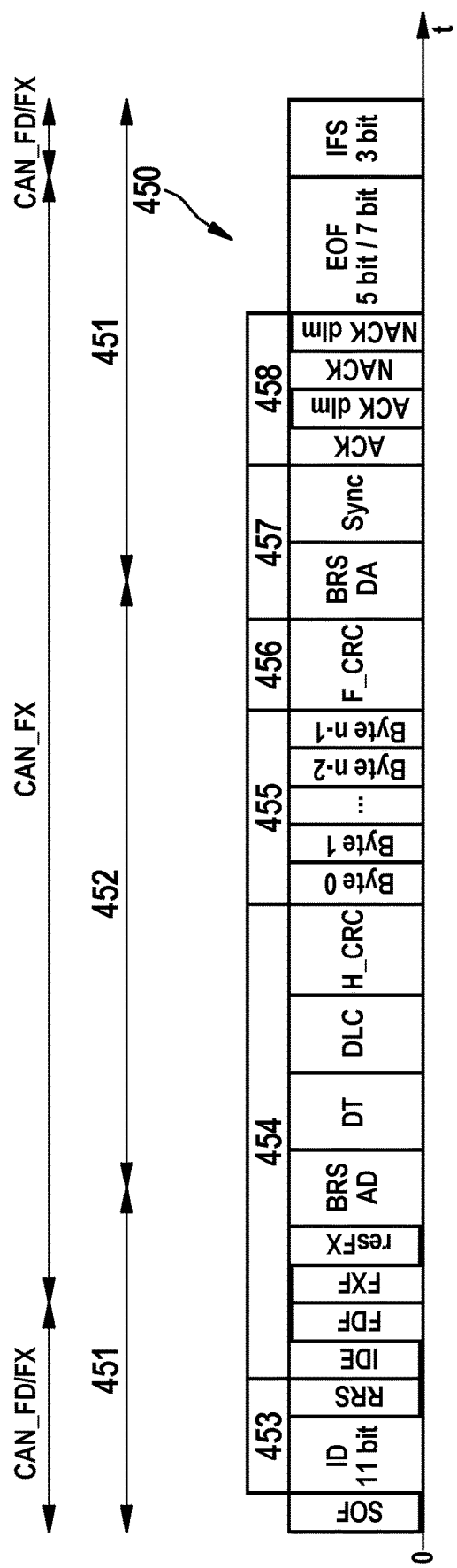
FIG. 2 shows a diagram to illustrate the structure of a message which may be transmitted by a user station of the bus system according to the first exemplary embodiment of the present invention.

FIG. 2 shows for message 45 a CAN FX frame 450, as is provided by communication control unit 11 for transceiver unit 12 for transmission onto bus 40. Communication control unit 11 creates frame 450 in the present exemplary embodiment as compatible with CAN FD, as also illustrated in FIG. 2. The same applies similarly for communication control unit 31 and transceiver unit 32 of user station 30.

According to FIG. 2, CAN FX frame 450 for the CAN communication on bus 40 is divided into different communication phases 451, 452, namely an arbitration phase 451 and a data phase 452. Frame 450 includes an arbitration field 453, a control field 454, a data field 455, a checksum field 456 for a checksum F_CRC, a synchronization field 457, and a confirmation field 458.

In arbitration phase 451, it is negotiated bitwise with the aid of an identifier (ID) in arbitration field 453 between user stations 10, 20, 30 which user station 10, 20, 30 wishes to transmit message 45, 46 having the highest priority and therefore receives an exclusive access to bus 40 of bus system 1 for the next time for transmission in subsequent data phase 452. A physical layer is used in arbitration phase 451 as in CAN and CAN-FD. The physical layer corresponds to the bit transfer layer or layer 1 of the conventional OSI model (open systems interconnection model).

An important point during phase 451 is that the conventional CSMA/CR method is used, which permits simultaneous access of user stations 10, 20, 30 to bus 40, without higher priority message 45, 46 being destroyed. Further bus user stations 10, 20, 30 may thus be added relatively easily to bus system 1, which is very advantageous.

The CSMA/CR method has the result that there must be so-called recessive states on bus 40, which may be overwritten by other user stations 10, 20, 30 having dominant states on bus 40. In the recessive state, high-resistance conditions prevail at an individual user station 10, 20, 30, which results in longer time constants in combination with the parasites of the bus circuitry. This results in a limit of the maximum bit rate of the current CAN FD physical layer to presently approximately 2 Mb per second in real vehicle use.

In data phase 452, in addition to a part of control field 454, the useful data of the CAN FX frame or message 45 from data field 455 and checksum field 456 for checksum F_CRC are transmitted.

A sender of message 45 begins a transmission of bits of data phase 452 onto bus 40 only when user station 10 has won the arbitration as the sender and user station 10 thus has exclusive access to bus 40 of bus system 1 for transmission as the sender.

Very generally, the following differing properties may be implemented in the bus system having CAN FX in comparison to CAN or CAN FD:

a) acceptance and possible adaptation of proven properties which are responsible for the robustness and user-friendliness of CAN and CAN FD, in particular the frame structure having an identifier and an arbitration according to the CSMA/CR method, b) increase of the net data transfer rate, in particular to approximately 10 Mb per second, c) raising the dimension of the useful data per frame, in particular to approximately 4 kB.

As shown in FIG. 2, user station 10 partially, in particular up to the FDF bit (inclusive), uses a format known from CAN/CAN FD according to ISO 11898-1:2015 in arbitration phase 451 as the first communication phase. In contrast, user station 10 uses a CAN FX format, which is described hereinafter, from the FDF bit in the first communication phase and in the second communication phase, data phase 452.

In the present exemplary embodiment, CAN FX and CAN FD are compatible. The res bit known from CAN FD, which is called the FXF bit hereinafter, is used for switching from the CAN FD format to the CAN FX format. Therefore, the frame formats of CAN FD and CAN FX are identical except for the res bit. A CAN FX user station, thus user stations 10, 30 here, also supports CAN FD.

Alternatively to frame 450 shown in FIG. 2, in which an identifier having 11 bits is used, a CAN FX expanded frame format is optionally possible, in which an identifier having 29 bits is used. Up to the FDF bit, this is identical to the conventional CAN FD expanded frame format from ISO 11898-1:2015.

According to FIG. 2, frame 450 is identical from the SOF bit up to the FDF bit, inclusive, to the CAN FD base frame format according to ISO 11898-1:2015. Therefore, the conventional structure is not explained further here. Bits which are shown by a thick stroke on their bottom line in FIG. 2 are transmitted as dominant in frame 450. Bits which are shown with a thick stroke on their top line in FIG. 2 are transmitted in frame 450 as recessive.

In general, two different stuffing rules are applied in the generation of frame 450. Up to the FXF bit in control field 454, the dynamic bit stuffing rule of CAN FD applies, so that after 5 identical bits in sequence, an inverse stuffing bit is to be inserted. After an FX bit in control field 454, a fixed stuffing rule applies, so that after a fixed number of bits, a fixed stuffing bit is to be inserted. Alternatively, instead of only one stuffing bit, a number of 2 or more bits may be inserted as fixed stuffing bits.

In frame 450, the FXF bit follows directly after the FDF bit, which corresponds in position to the "res bit" in the CAN FD base frame format, as mentioned above. If the FXF bit is transmitted as 1, thus recessive, it therefore identifies frame 450 as a CAN FX frame. For a CAN FD frame, communication control unit 11 sets the FXF bit as 0, thus dominant.

After the FXF bit, a resFX bit follows in frame 450, which is a dominant bit for the future use. The resFX has to be transmitted for frame 450 as 0, thus dominant. However, if user station 10 receives a resFX bit as 1, thus recessive, receiving user station 10 enters, for example, a protocol exception state, as is executed in the case of a CAN FD message 456 for a res=1. The resFX could also be defined precisely inversely, thus that it has to be transmitted as 1, thus recessive, so that the receiving user station enters the protocol exception state in the case of a dominant resFX bit.

After the resFXF bit, a sequence BRS AD follows in frame 450, in which a predetermined bit sequence is coded. This bit sequence permits simple and reliable switching from the arbitration bit rate of arbitration phase 451 to the data bit rate of data phase 452. For example, the bit sequence of BRS AD is made up of a recessive arbitration bit followed by a dominant data bit. In this example, the bit rate may be switched at the edge between the two mentioned bits.

After sequence BRS AD, a DT field follows in frame 450, in which the data type (DT) of the useful data of data field 455 is indicated, which is described in more detail hereinafter. The DT field has a length of, for example, 1 byte; therefore, $2^8=256$ data types may be defined. Of course, a different length is selectable for the DT field. The data type identifies the content of data field 455 with regard to which type of information is contained in data field 455. Depending on the value in the DT field, additional headers or trailers are also transmitted in data field 455, which are provided in addition to the actual useful data (user data), as described in more detail hereinafter on the basis of FIG. 7A through FIG. 7E. Alternatively, the DT field is situated at the beginning of data field 455, thus, for example, in the first byte of data field 455.

After the DT field, a DLC field follows in frame 450, in which the data length code (DLC) is inserted, which indicates the number of the bytes in data field 455 of frame 450. The data length code (DLC) may assume any value from 1 to the maximum length of data field 455 or data field length. If the maximum data field length is in particular 2048 bits, the data length code (DLC) requires a number of 11 bits under the assumption that DLC=0 means a data field length having a number of 1 byte and DLC=2047 means a data field length having a number of 2048 bytes data field length. Accordingly, a data field 455 of length 0 could alternatively be permitted, for example as in CAN. In this case, DLC=0 would code, for example, the data field length having the number of 0 bytes. The maximum data field length which may be coded is, for example, with 11 bits then $(2^{11})-1=2047$.

After the DLC field, a header checksum H_CRC follows in frame 450. The header checksum is a checksum to safeguard the header of frame 450, that is to say all bits from the beginning of frame 450 with the SOF bit to the beginning of header checksum H_CRC, including all dynamic and optionally the fixed stuffing bits up to the beginning of header checksum H_CRC. The length of header checksum H_CRC and thus of the checksum polynomial according to the cyclic redundancy check (CRC) is to be selected in accordance with the desired Hamming distance. The data word to be safeguarded by header checksum H_CRC is longer than 27 bits in the case of a data length code (DLC) of 11 bits. Therefore, the polynomial of header checksum H_CRC has to be at least 13 bits long to achieve a Hamming distance of 6. The calculation of header checksum H_CRC is described in more detail hereinafter.

After header checksum H_CRC, data field 455 follows in frame 450. Data field 455 is made up of 1 through n data bytes, n being, for example, 2048 bytes or 4096 bytes or another arbitrary value. Alternatively, a data field length of 0 is possible. The length of data field 455 is coded in the DLC field, as described above. As described above, the DT field is optionally situated at the beginning of data field 455, thus, for example, in the first byte of data field 455.

After data field 455, a frame checksum F_CRC follows in frame 450. Frame checksum F_CRC is made up of the bits of frame checksum F_CRC. The length of frame checksum F_CRC and thus of the CRC polynomial is to be selected in accordance with the desired Hamming distance. Frame checksum F_CRC safeguards entire frame 450. Alternatively, optionally only data field 455 is safeguarded by frame checksum F_CRC. The calculation of frame checksum F_CRC is described in more detail hereinafter.

After frame checksum F_CRC, a sequence BRS DA follows in frame 450, in which a predetermined bit sequence is coded. This bit sequence permits simple and reliable switching from the data bit rate of data phase 452 to the arbitration bit rate of arbitration phase 451. For example, the bit sequence of the BRS DA is made up of a recessive data bit, followed by a dominant arbitration bit. In this example, the bit rate may be switched at the edge between the two mentioned bits.

After sequence BRS DA, a sync field follows in frame 450, in which a synchronization pattern (sync pattern) is provided. The synchronization pattern is a bit pattern which permits a receiving user station 10, 30 to detect the beginning of arbitration phase 451 after data phase 452. The synchronization pattern permits receiving user station 10, 30, which does not know the correct length of data field 455 due to an incorrect header checksum H_CRC, for example, to synchronize. Subsequently, this user station may transmit a "negative acknowledge" to communicate the erroneous reception. This is very important in particular if CAN FX no longer permits error frames 47 (error flags) in data field 455.

After the sync field, an acknowledgment field (ACK field) follows in frame 450, which is made up of multiple bits, namely in the example of FIG. 2 an ACK bit, an ACK-dlm bit, a NACK bit, and a NACK-dlm bit. The NACK bit and the NACK-dlm bit are optional bits. Receiving user stations 10, 30 transmit the ACK bit as dominant when they have correctly received frame 450. The transmitting user station transmits the ACK bit as recessive.

Therefore, the bit originally transmitted in frame 450 on bus 40 may be overwritten by receiving user stations 10, 30. The ACK-dlm bit is transmitted as a recessive bit, which is used for separation from other fields. The NACK bit and the NACK-dlm bit are used so that a receiving user station may signal an incorrect reception of frame 450 on bus 40. The function of the bits is like that of the ACK bit and the ACK-dlm bit.

After the acknowledgment field (ACK field), an end field (EOF=end of frame) follows in frame 450. The bit sequence of the end field (EOF) is used to identify the end of frame 450. The end field (EOF) ensures that a number of 8 recessive bits is transmitted at the end of frame 450. This is a bit sequence which cannot occur inside frame 450. The end of frame 450 may thus be reliably detected by user stations 10, 20, 30.

The end field (EOF) has a length which is different depending on whether a dominant bit or a recessive bit was seen in the NACK bit. If the transmitting user station has received the NACK bit as dominant, the end field (EOF) has a number of 7 recessive bits. Otherwise, the end field (EOF) is only 5 recessive bits long.

After the end field (EOF), an inter frame space (IFS) follows in frame 450. This inter frame space (IFS) is designed as in CAN FD corresponding to ISO 11898-1: 2015.

FIG. 2 indicates a special example of the sequence of the divisions of the header. Alternatively, the sequence of the divisions of the header may be sorted differently. For example, the DLC field may be situated before the DT field, as shown in FIG. 3 as a modification of the present exemplary embodiment.

Figure 4:
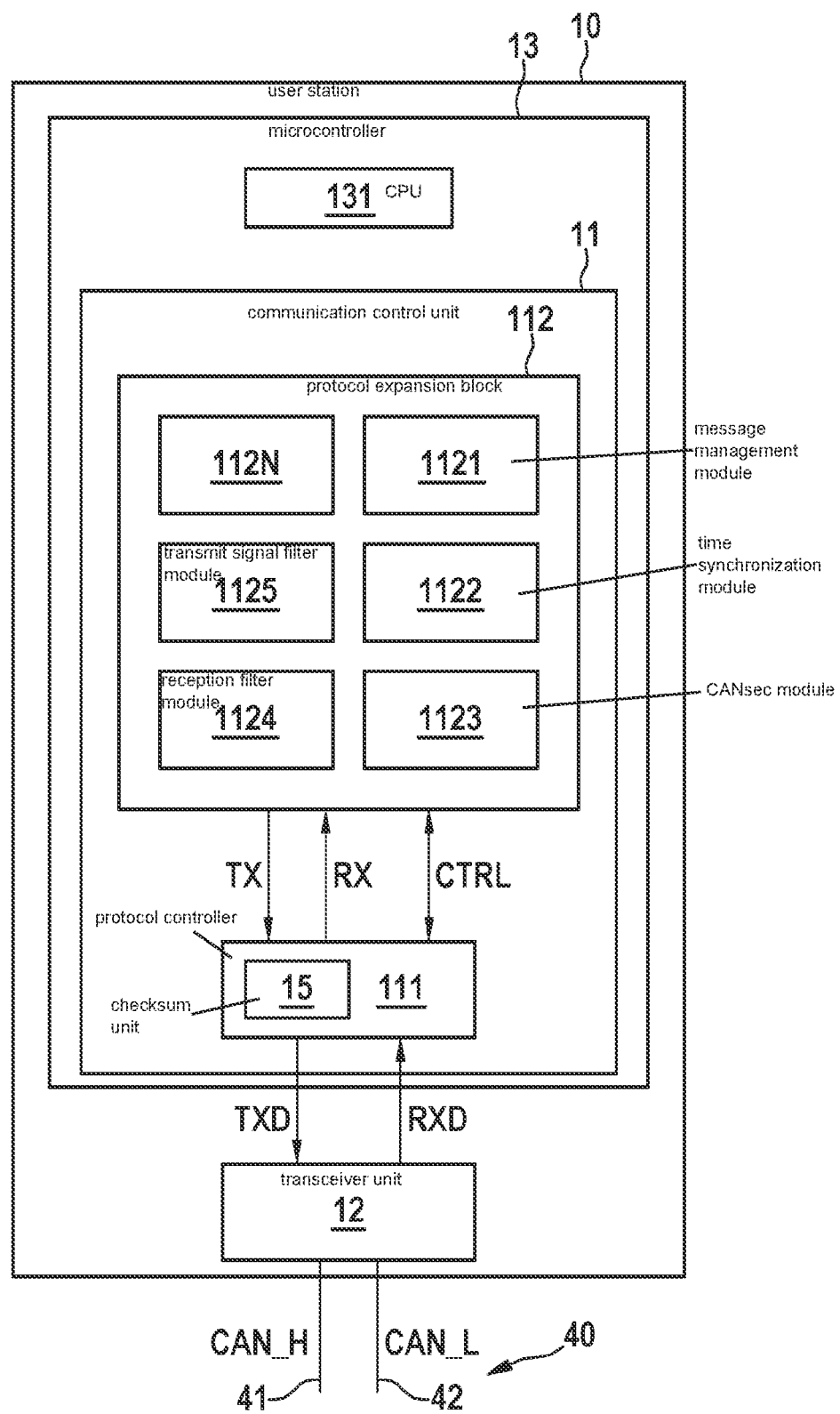
FIG. 4 shows a simplified schematic block diagram of a user station of the bus system according to the first exemplary embodiment of the present invention.

FIG. 4 shows the fundamental structure of user station 10 including communication control unit 11, transceiver unit 12, and checksum unit 15, which is part of communication control unit 11, more precisely of its protocol controller 111. Moreover, communication control unit 11 includes a protocol expansion block 112, having at least one but in particular a plurality of expansion modules 1121 through 112N, for example, a message management module 1121, a time synchronization module 1122, a CANsec module 1123, a reception signal filter module 1124, a transmit signal filter module 1125, etc. An arbitrary number of the modules or other modules may be provided and used.

Figure 3:
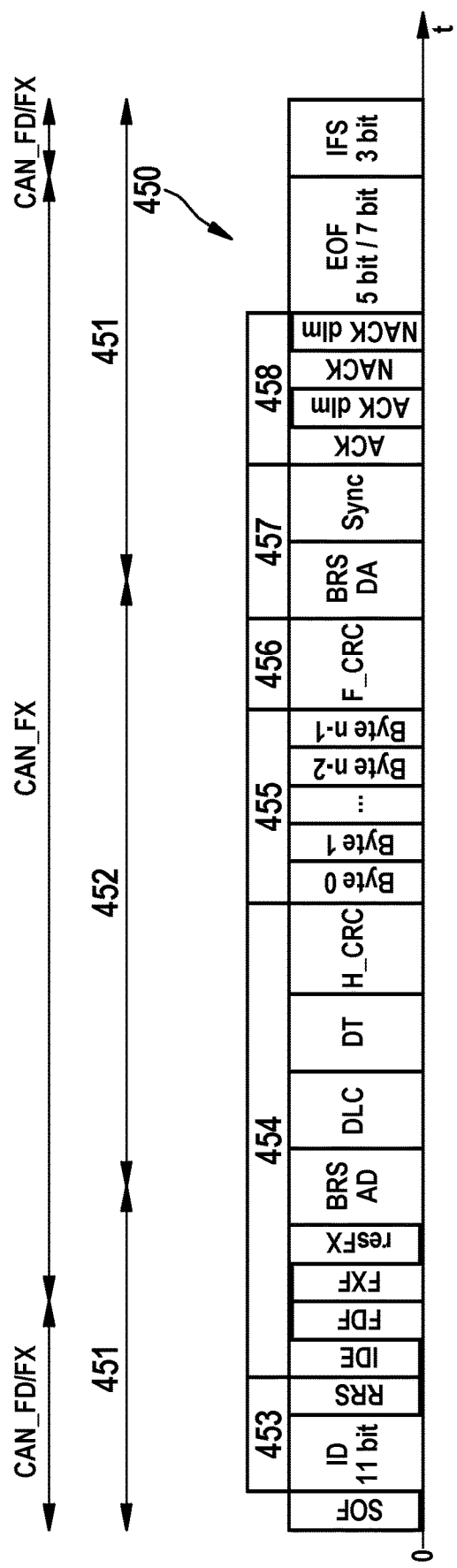
FIG. 3 shows a diagram to illustrate the structure of a message which may be transmitted by a user station of the bus system according to a modification of the first exemplary embodiment of the present invention.

User station 30 is constructed in a similar way as shown in FIG. 3, but checksum unit 35 according to FIG. 1 is situated separately from communication control unit 31 and transceiver unit 32. User station 30 is therefore not described separately.

According to FIG. 4, user station 10 includes, in addition to communication control unit 11 and transceiver unit 12, a microcontroller 13, which is associated with communication control unit 11 and includes a central processing unit (CPU) 131. In addition, an energy supply unit (not shown) is typically installed, which supplies transceiver unit 12 with electrical energy. The energy supply unit typically supplies a voltage CAN Supply of 5 V. If needed, however, the energy supply unit may supply a different voltage having a different value. Additionally or alternatively, the energy supply unit may be designed as a power source.

Communication control unit 11 is responsible for the implementation of the CAN FX functions.

All high-value protocol expansion functions are combined in protocol expansion block 112. The functions may be implemented modularly, thus by individual modules 1121 through 112N. The protocol expansions or protocol expansion functions may thus be supplemented easily and have no feedback on protocol controller 111. The protocol expansions may alternatively or additionally be implemented in software in principle, which is then executed on central processing unit 131 of microcontroller 13. A signal CRTL is exchangeable between protocol controller 111 and protocol expansion block 112, using which the transmission and reception may be controlled.

For example, message management module 1121 (message handler) stores a limited number of messages 45 to be transmitted and received. The required memory in which messages 45 are stored may alternatively be situated outside communication control unit 11, the pieces of status information, thus, for example, whether a message 45 is stored, being stored in message management module 1121. If necessary, message management module 1121 may also transmit messages 45 divided onto multiple smaller frames 450 and receive messages 45 divided onto multiple smaller frames 450—i.e., associate the parts of message 45 with a message.

For example, time synchronization module 1122 (time sync) carries out the time synchronization autonomously and transmits and receives CAN FX messages 45 for this purpose. Time synchronization module 1122 provides the pieces of information to central processing unit 131.

For example, CANsec module 1123 secures messages 45 using cryptographic methods if needed.

For example, reception signal filter module 1124 may filter incoming messages 45 to relieve central processing unit 131.

For example, transmit signal filter module 1125 may assign a priority ID (ID for arbitration) to individual messages 45 and adapt it dynamically. Moreover, transmit signal filter module 1125 may optionally ensure that a message 45 to be transmitted is cryptographically secured by the CANsec module, before the message is then transmitted in encrypted form.

Checksum unit 15 calculates above-described frame checksum F_CRC and above-described header checksum H_CRC.

Transceiver unit 12 includes a transmitter (not shown) and a receiver. Although reference is always made in the following to transceiver unit 12, it is alternatively possible to provide the receiver in a separate unit externally from the transmitter. The transmitter and the receiver may be constructed as in a conventional transceiver unit 22.

Transceiver unit 12 is connected to bus 40, more precisely its first bus wire 41 for CAN H or CAN-FX H and its second bus wire 42 for CAN L or CAN-FX L.

In operation of bus system 1, the transmitter of transceiver unit 12 converts a transmit signal TXD of communication control unit 11 into corresponding signals CAN-FX H and CAN-FX L for bus wires 41, 42 and transmits these signals CAN-FX H and CAN-FX L at the terminals for CAN H and CAN L on bus 40. Transceiver unit 12 implements layer 1 of the conventional OSI model, that means transceiver unit 12 physically codes the individual bits to be transmitted on bus 40, for example as a differential voltage VDIFF=CAN-FX H−CAN-FX L.

Figure 5:
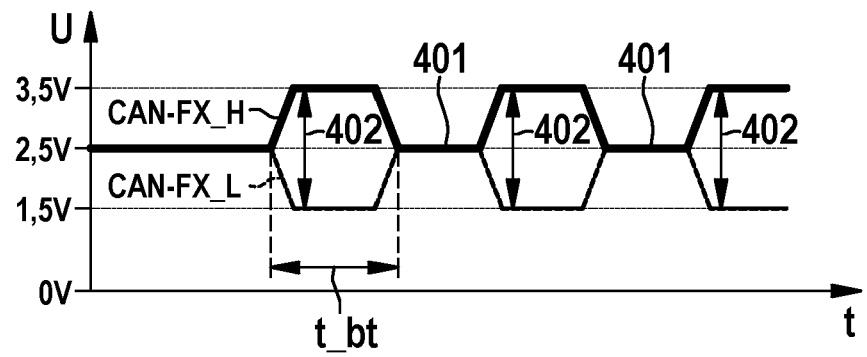
FIG. 5 shows a time curve of bus signals CAN H and CAN L, which are bus signals CAN-FX H and CAN-FX L in the user station according to the first exemplary embodiment of the present invention.

The receiver of transceiver unit 12 forms a reception signal RXD from signals CAN-FX H and CAN-FX L according to FIG. 5 received from bus 40 and passes on this reception signal to communication control unit 11, as shown in FIG. 4. With the exception of an idle or standby state, transceiver unit 12 always listens to a transfer of data or messages 45, 46 on bus 40 using the receiver in normal operation, and does so regardless of whether or not transceiver unit 12 is the transmitter of message 45.

Figure 6:
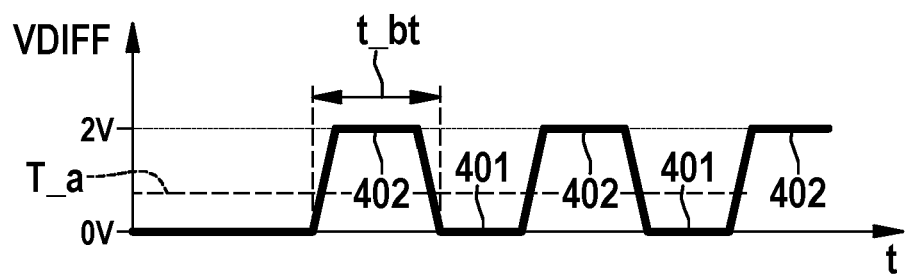
FIG. 6 shows a time curve of a differential voltage VDIFF of bus signals CAN-FX H and CAN-FX L in the user station according to the first exemplary embodiment of the present invention.

According to the example of FIG. 5, signals CAN-FX H and CAN-FX L, at least in arbitration phase 451, have dominant and recessive bus levels 401, 402, as known from CAN. A differential signal VDIFF=CAN-FX H−CAN-FX L forms on bus 40, which is shown in FIG. 6. The individual bits of signal VDIFF having bit time t_bt may be detected with the aid of a reception threshold of 0.7 V. In data phase 452, the bits of signals CAN-FX H and CAN-FX L are transmitted faster, thus with a shorter bit time t_bt, than in arbitration phase 451. Signals CAN-FX H and CAN-FX L therefore differ in data phase 452 at least in their higher bit rate from conventional signals CAN H and CAN L.

The sequence of states 401, 402 for signals CAN-FX H, CAN-FX L in FIG. 4 and the curve of voltage VDIFF resulting therefrom in FIG. 6 are used only to illustrate the function of user station 10. The sequence of data states for bus states 401, 402 is selectable as needed.

In other words, the transmitter of transceiver unit 12 generates, in a first operating mode according to FIG. 4, a first data state as bus state 402 having different bus levels for two bus wires 41, 42 of the bus line and a second data state as bus state 401 having the same bus level for two bus wires 41, 42 of the bus line of bus 40.

In addition, the transmitter of transceiver unit 12 transmits the bits at a higher bit rate on bus 40 for the time curves of signals CAN-FX H, CAN-FX L in a second operating mode, which includes data phase 452. The CAN-FX H and CAN-FX L signals may moreover be generated in data phase 452 with the aid of a different physical layer than in CAN FD. The bit rate in data phase 452 may thus be increased still further than in CAN FD.

Figure 7:
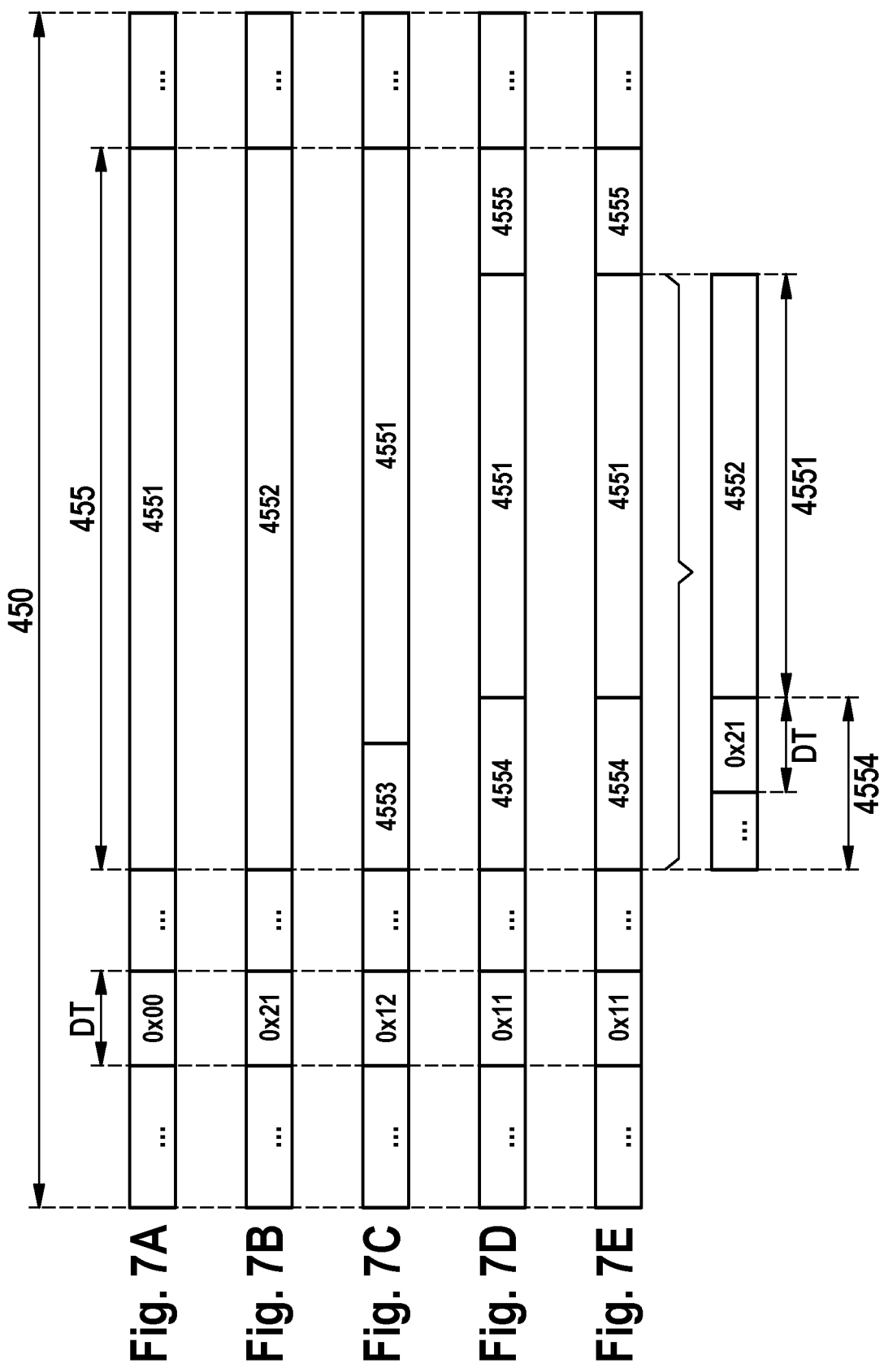
FIGS. 7A through 7E show a diagram to illustrate the structure of messages according to FIG. 2 having various data types.

Examples of various data types are shown in FIG. 7A through FIG. 7E in the DT field and specified in the following. The following examples illustrate what the DT field may be used for, for example:

In FIG. 7A, value 0x00 is contained in the DT field of a frame 450, which denotes a normal CAN FX frame 450 in which raw data are contained as useful data 4551 in data field 455. Frame 450 has no expansions and is therefore constructed as is typical in classic CAN and CAN FD. This data type is of interest in particular for the user who uses CAN FX only because of the higher bit rate and the large possible data field length.

In addition, value 0x01 through 0x0F may be contained in the DT field of a frame 450, which denotes management messages within the CAN FX network, bus system 1 being a part of the CAN FX network. Only communication control units 11, 31 (CAN FX controller) may autonomously or exclusively transmit frames 450 having such a value or data type in the DT field. At least one of these values 0x01 through 0x0F is exclusively available to communication control units 11, 31. That means the software on microcontroller 13 or another unit of user station 10, 30 may not instruct CAN FX controller 11 to transmit a frame 450 having such a value or data type in the DT field. One application of this is an auto-negotiation, in which the CAN FX controller or communication control units 11 negotiate something at bus 40, for example a bit rate or other parameters for communication in bus system 1. Another application is a time synchronization, in which the CAN FX controller or communication control unit 11 may transmit and receive frames for the time synchronization. For example, data type DT=0x04 stands for a synchronization message for the time synchronization. Frame 450 having these data types DT does not have to be passed on to the user, i.e., to the central processing unit (CPU), but may be filtered out.

In addition, value 0x10 may be contained in the DT field of a frame 450, which denotes segmented CAN FX frame 450. In principle, the transmitting user station may also transmit a message 45 in multiple frames 450 having shorter data field 455 instead of in one frame 450 having long data field 455. This corresponds to the behavior of a simple transport protocol. Shorter frames 450 shorten the required waiting times for other frames 450 having higher priority and thus increase the real-time capability.

The receiver of frame 450 recognizes at DT field=0x10 that it is only a part of a message 45. At the beginning of data field 455, there is a segment header, which contains the following information: which segment (part) of the message this frame 450 transfers, how many segments there are in total, and data type DT for the content of message 45.

In FIG. 7B, value 0x21 is contained in the DT field of a frame 450, which denotes Ethernet tunneling. One of the intended application fields of CAN FX is tunneling, i.e., transparent relay, of Ethernet frames 4552. Therefore, an Ethernet frame 4552 is located in data field 455, that is to say more precisely all fields of Ethernet frame 4552 beginning with the "destination MAC address" to the "payload" inclusive, according to the Ethernet protocol.

In FIG. 7C, value 0x12 is contained in the DT field of a frame 450, which denotes a message identifier (message ID) 4553. This means that a message identifier 4553 is stored in the first 4 bytes of data field 455. This is advantageous since CAN FX only has a short ID in arbitration phase 451 to increase the net data rate. The "RX message filter" typical in CAN may filter in the case of received frames having DT=0x12 for message identifier 4553. In frames 450 having another data type DT, it is advantageous to filter for the fields provided by data type DT. These fields are selectable arbitrarily. General filtering for the first 4 bytes in data field 455, without considering data type DT in the DT field is not useful.

In FIG. 7D, value 0x11 is contained in the DT field of a frame 450, which denotes a CAN security frame (CANsec=CAN security). Such a CAN security frame means that parts of data field 455 and other fields of frame 455 are secured using crypto mechanisms. For example, a security header 4554 is located at the beginning of data field 455. Security header 4554 contains pieces of information about the type of the security measure taken, in particular whether the integrity of message 45 is protected by a signature or message authentication code, or whether data field 455 is encrypted to preserve the confidentiality, or whether both security measures are implemented. Moreover, information on the key used, for example key 17 and/or information on the communication channel and the packet number may be included. For example, a security trailer 4555 having a signature is in the last 4 bytes of data field 455 if the option of signing is set in security header 4554. Otherwise, security trailer 4555 is absent.

In addition, value 0x13 may be contained in the DT field of a frame 450, which denotes CAN FX frames 450 having source and destination identifiers (source and destination ID). A source identifier and a destination identifier are stored in the first bytes of data field 455. This simulates the source address and the destination address contained in Ethernet frames. Reception signal filter 1124 (RX message filter) typical in the case of CAN may filter for the source identifier and destination identifier in received frames 450 having data type DT=0x13.

In addition, value 0x20 may be contained in the DT field of a frame 450, which denotes, for example, CAN FX frames 450 having Internet protocol, version 4. In such frames 450, a packet of the Internet protocol of version 4 is located in data field 455. Of course, arbitrary packets according to other protocols are possible depending on how the data types DT are defined. The Internet protocol is also used more and more frequently in internal vehicle networks.

As described above in conjunction with FIG. 2, the data length code (DLC) of message 45 specifies the length of data field 455, which corresponds to the length of the useful data including possible further headers 4554 or trailers 4555 because of data type DT used. It would alternatively be possible to code only the length of the useful data using the data length code (DLC), as is executed in the case of Ethernet. However, this has the disadvantage that when decoding frame 450, the CAN FX protocol controller or communication control unit 11 has to know all data types DT used to know where frame 450 ends.

According to FIG. 7E, nesting of data types DT is also possible. Data type DT may indicate, for example, that a header 4554 which is housed in data field 455 also contains a data type DT, as shown in FIG. 7E as an example. A recursive data type is possible here. In other words, nesting is possible multiple times. For this purpose, many or deep nesting levels are possible. Therefore, at least one field for a data type DT is provided in data field 455 and a value is written in this field in data field 455 which indicates which type of information is located in data field 455 of frame 450. In particular, data field 455 may be used for various types of information.

In the special example of FIG. 7E, data type DT of the CAN FX frame has value 0x11, which stands for CANsec. Safety header 4554 in data field 455 also contains a data type DT. If an Ethernet frame 4552 is contained in a message 45 secured using CANsec, data type DT in security header 4554 is set to 0x21, as shown in the middle part of FIG. 7E. If an IPv4 packet were contained in the secure frame, data type DT=0x20 would thus be indicated in security header 4554.

Figure 8:
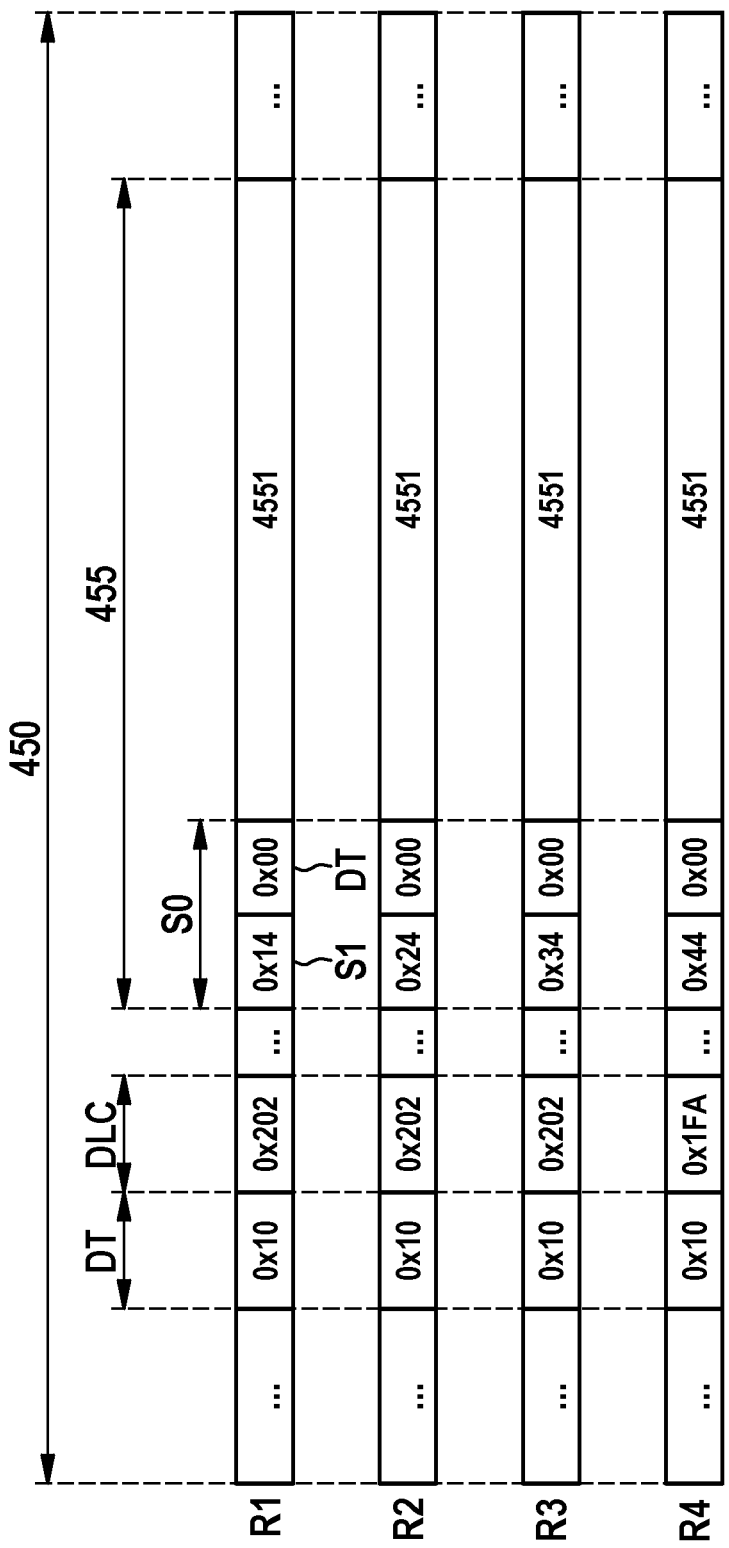
FIG. 8 shows a diagram to illustrate the structure of a segmented message according to FIG. 2.

FIG. 8 shows in a special example how a CAN FX message 450 having 2040 bytes is transmitted in 4 frames R1 through R4, because the maximum amount of useful data 4551 was limited to 512 bytes per frame R1, R2, R3, R4 by the user. Therefore, 4 frames are transmitted, namely the 3 frames R1, R2, R3 each having 512 bytes of useful data 4551, and one frame, namely frame R4, having 504 bytes of useful data 4551. The data length code (DLC) in the first 3 frames R1, R2, R3 has the value 514 bytes. In last frame R4, the data length code (DLC) has the value 506 bytes, because a segment header S0 is contained in each case, which has 2 bytes. In the first byte of segment header S0, in a field S1, the number of the current segment (4 bits) and subsequently the total number of the segments (4 bits) are indicated, as illustrated in FIG. 8. Of course, other segmentations of a frame 450 into frames R1 through RN are possible, N being an arbitrary natural number.

Figure 9:
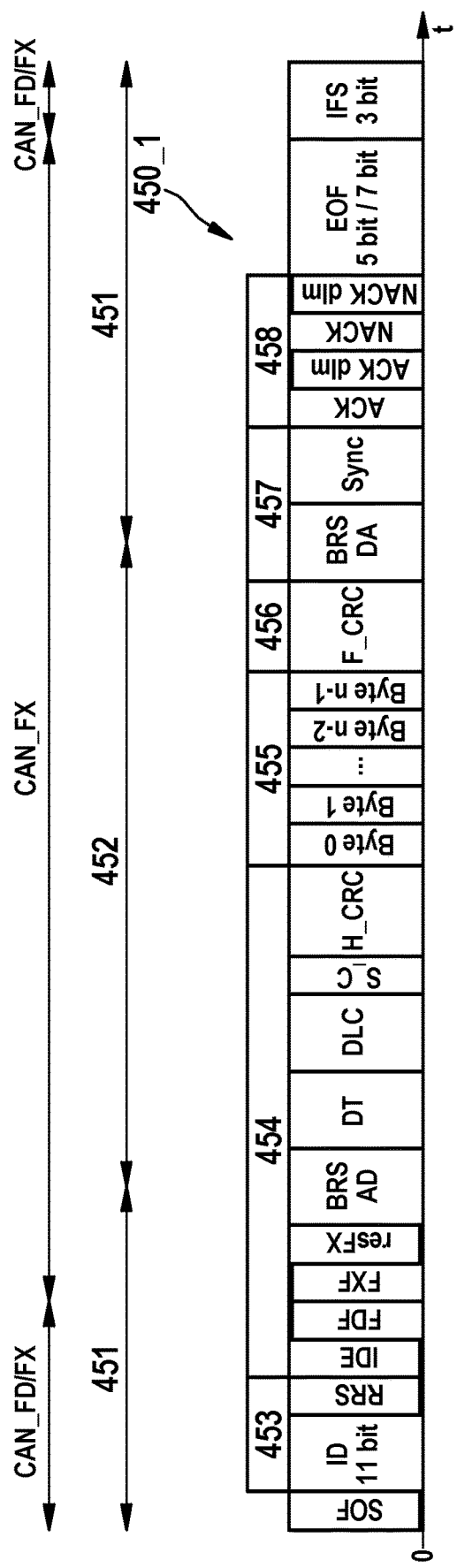
FIG. 9 shows a diagram to illustrate the structure of a message which may be transmitted by a user station of the bus system according to a third exemplary embodiment of the present invention.

FIG. 9 shows a frame 450_1 according to a third exemplary embodiment, in which CAN FX and CAN FD are compatible. In this exemplary embodiment, frame 450_1 and thus the CAN FX frame format differ from frame 450 of FIG. 2, as described hereinafter. Only the differences to frame 450 of FIG. 2 are described here. Otherwise, frames 450, 450_1 of the two exemplary embodiments are identical.

In frame 450_1, a S_C field is incorporated before header checksum H_CRC. The number of the transmitted dynamic stuffing bits (stuffing count) is transmitted in the S_C field. The S_C field may include 1 through n bits. In this case, thus for frame 450_1, at most 3 dynamic stuffing bits occur, i.e., n may be selected as 2. Alternatively, the transfer of "number of dynamic stuffing bits modulo X" is possible, to reduce the number of the bits to be transferred. X may be 2, for example.

However, the data overhang of frame 450_1 becomes greater in comparison to frame 450 of FIG. 2 due to this variant.

In a modification of frame 450_1, a stuffing compensator is inserted in the S_C field instead of the number of the transmitted dynamic stuffing bits (stuffing count). The stuffing compensator includes 0 through m bits, m corresponding to the maximum number of dynamic stuffing bits which may occur up to the FDF bit. The sum of dynamic stuffing bits and stuffing compensator bits is always equal to m.

The stuffing compensator ensures that the length of the frame header of frame 450_1 is constant. For example, in the case of 11 bits for the identifier (ID), at most three dynamic stuffing bits may occur. Therefore, in the case of an identifier (ID) having 11 bits, m=3. In a frame 450_1 including one dynamic stuffing bit, the stuffing compensator is 2 bits long, since 3-1=2 bits applies. Data field 455 thus always begins after a fixed number of bits from the beginning of the frame.

Figure 10:
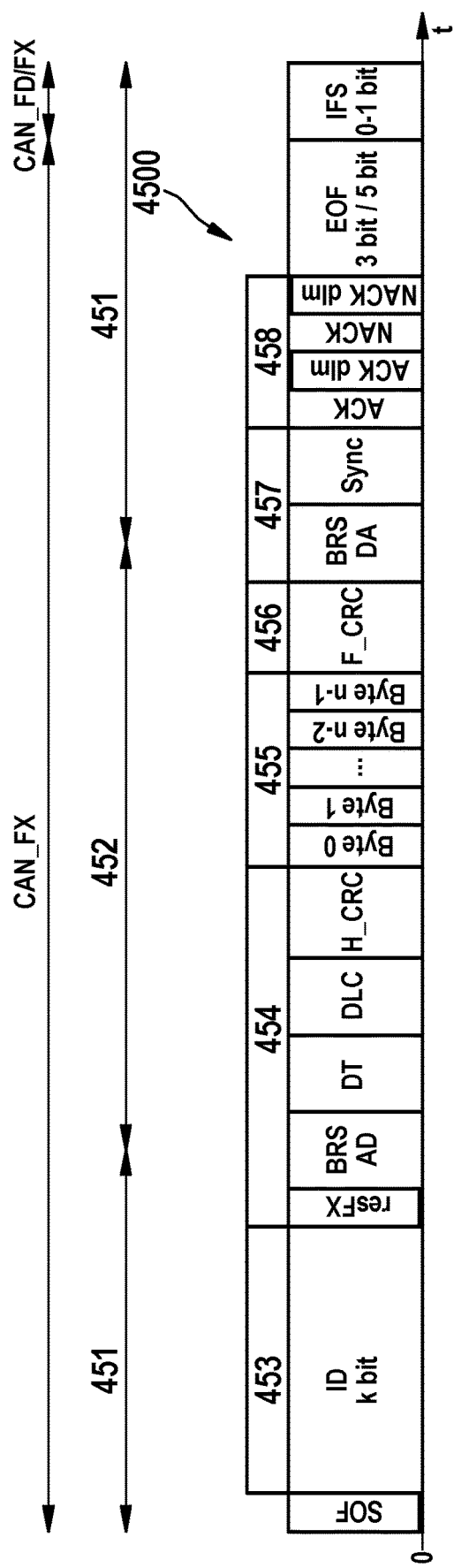
FIG. 10 shows a diagram to illustrate the structure of a message which may be transmitted by a user station of the bus system according to a fourth exemplary embodiment of the present invention.

FIG. 10 shows a frame 4500 according to a fourth exemplary embodiment, in which CAN FX and CAN FD are not compatible. In this exemplary embodiment, frame 4500 and thus the CAN FX frame format differs from frame 450 of FIG. 2, as described in the following. In this case, only the differences to frame 450 of FIG. 2 are described. Otherwise, frames 450, 4500 of the two exemplary embodiments are identical.

In general, only the fixed stuffing rule is used in the generation of frame 4500 according to the present exemplary embodiment, so that a fixed stuffing bit is to be inserted after a fixed number of bits. Alternatively, instead of only one stuffing bit, 2 or more bits may also be inserted as fixed stuffing bits. With known value of the data length code (DLC), this results in a constant frame length or a constant length of frame 4500. This prevents various problems which are induced by dynamic stuffing bits.

In frame 4500 of FIG. 10 according to the present exemplary embodiment, the identifier (ID) is no longer restricted to a number of 11 bits or 29 bits as in CAN FD. Number k of the bits of the identifier (ID) may be freely selected. However, number k is alternatively establishable at a fixed value. For a high net data rate, an ID having k=8 bits is reasonable. This is sufficient to give sufficiently many bus access priorities to each user station 10, 20, 30 of bus system 1. Of course, however, a different value is selectable for k, depending on the demand and number of various priorities in bus system 1.

Bits RRS, IDE, FDF, FXF of frame 450 of FIG. 2 are no longer necessary in frame 4500 of FIG. 10 and are omitted. This saves 4 bits, so that the frame overhang is reduced. The net data rate in bus system 1 is thus increased.

The end field (EOF) only has a number of 5 bits in frame 4500 of FIG. 10 when the NACK bit is dominant. In contrast, if the NACK bit is recessive, the end field (EOF) has a number of 3 bits. This ensures that a number of 6 recessive bits is transmitted at the end of frame 4500. This number of recessive bits cannot occur at any other point in a valid frame 4500 if a fixed stuffing bit is incorporated after 5 identical bits in arbitration phase 451. Alternatively, it could be more than 6 bits. In particular, the number of the EOF bits has to be adapted to the number of the bits after which a fixed stuffing bit is inserted.

The inter frame space (IFS) does not require a minimum length in frame 4500. In particular, the inter frame space (IFS) may have the length 0, and thus may be completely omitted. In such a case, two frames 4500 are transmitted continuously in succession. However, an inter frame space (IFS) having a number of, for example, 1 bit is also useful to increase the robustness of bus system 1 in comparison to the above-mentioned case. A new user station on bus 40 may synchronize itself more reliably due to the now 7 recessive bits between two frames 4500.

Therefore, no dynamic stuffing bits occur in frame 4500. Field S_C from FIG. 10 is therefore not required, so that the frame overhang is reduced still further. Optionally, header checksum H_CRC may also be omitted, so that the frame overhang is reduced still further. This increases the net data rate in bus system 1 even more.

All above-described embodiments of user stations 10, 20, 30, bus system 1, and the method carried out therein may be used individually or in all possible combinations. In particular, all features of the above-described exemplary embodiments and/or their modifications may be combined as desired. Additionally or alternatively, in particular the following modifications are possible.

Although the present invention was described above on the basis of the example of the CAN bus system, the present invention may be used in any communication network and/or communication method in which two different communication phases are used, in which the bus states differ which are generated for the different communication phases. In particular, the present invention is usable in developments of other serial communication networks, such as Ethernet and/or 100 base T1 Ethernet, fieldbus systems, etc.

In particular, bus system 1 according to the exemplary embodiments may be a communication network in which data are serially transferrable at two different bit rates. It is advantageous but not a necessary requirement that an exclusive, collision-free access of a user station 10, 20, 30 to a shared channel is ensured in bus system 1 at least for certain time spans.

The number and arrangement of user stations 10, 20, 30 in bus system 1 of the exemplary embodiments is arbitrary. In particular, user station 20 in bus system 1 may be omitted. It is possible that one or multiple of user stations 10 or 30 are present in bus system 1. It is possible that all user stations are designed identically in bus system 1, and thus only user station 10 or only user station 30 is present.

What is claimed is:

1. A user station for a serial bus system for a vehicle, comprising:
a communication control unit to control a communication of the user station with at least one other user station of the bus system; and
a transceiver unit for transmitting a transmit signal generated by the communication control unit on a bus of the bus system, wherein for a message which is exchanged between user stations of the bus system, a bit time of a signal transmitted in a first communication phase on the bus differs from a bit time of a signal transmitted in a second communication phase;
wherein the communication control unit is configured to generate the transmit signal according to a frame, in which in addition to a field which indicates a priority of the message, a field for a data type is provided, and the communication control unit is configured to write a value in the field for the data type which indicates which type of information is located in a data field of the frame,
wherein the user stations include a control unit, a sensor, and/or a display device of a motor vehicle,
wherein bus wires are used for electrical signal transmission after coupling in a dominant level or generating recessive levels for a signal in a transmit state, wherein messages are serially transmittable as signals among the user stations via the bus, and wherein if an error occurs during the communication on the bus, an error frame is transmitted, and
wherein the following differing properties are implemented in the bus system having CAN XL, including a frame structure having an identifier and an arbitration according to a carrier sensing multiple access process with collision resolution (CSMA/CR).

2. The user station as recited in claim 1, wherein the communication control unit is configured to provide the field for the data type in the transmit signal prior to or after a field for a data length code of the data field.

3. The user station as recited in claim 1, wherein the communication control unit is configured to provide the field for the data type in the transmit signal in a first byte and/or second byte of the data field.

4. The user station as recited in claim 1, wherein the communication control unit is configured, in the case of a predetermined value in the field for the data type, to additionally provide in the data field at least one field for a data type and to write a value in the at least one field in the data field which indicates which type of information is located in the data field of the frame.

5. The user station as recited in claim 4, wherein the predetermined value in the field for the data type indicates that useful data are divided into multiple frames and a header is placed before the at least one field for a data type in the data field, whose at value indicates a serial number of the frames and a total number of the frames, into which the useful data are divided.

6. The user station as recited in claim 1, wherein the type of information includes that useful data of the message include raw data, or that the useful data include an Ethernet frame, or that the useful data include a packet of an Internet protocol, or that at least a part of the frame is secured using crypto mechanisms, or that the useful data include data for negotiating a predetermined parameter for communication in the bus system, or that the useful data include data for time synchronization, or that the useful data include a message identifier, or that the useful data include specifications on a source of the message and the destination of the message.

7. The user station as recited in claim 1, wherein at least one predetermined value for a data type is exclusively available to the communication control unit, which may not be transmitted by other units of the user station.

8. The user station as recited in claim 1, further comprising:
a protocol expansion block to evaluate the field for the data type and an optionally provided additional field for a data type in useful data of the message and to execute a required handling of the message based on an evaluation result.

9. The user station as recited in claim 8, wherein the protocol expansion block includes at least one module, which executes the evaluation and the execution of the required handling of the message.

10. The user station as recited in claim 8, wherein the evaluation and/or the execution of the required handling of the message, is executed using hardware.

11. The user station as recited in claim 8, wherein the evaluation and/or the execution of the required handling of the message is executed using software which runs on a microcontroller of the user station.

12. The user station as recited in claim 1, wherein the frame formed for the message is compatible with CAN FD.

13. The user station as recited in claim 1, wherein it is negotiated in the first communication phase which of the user stations of the bus system receives an at least temporary exclusive, collision-free access to the bus in a following second communication phase.

14. A bus system, comprising:
a bus; and
at least two user stations which are connected to one another via the bus so that they may serially communicate with one another and of which at least one user station is a user station including:
a communication control unit to control a communication of the user station with at least one other user station of the bus system, and
a transceiver unit for transmitting a transmit signal generated by the communication control unit on a bus of the bus system, wherein for a message which is exchanged between user stations of the bus system, a bit time of a signal transmitted in the first communication phase on the bus differs from a bit time of a signal transmitted in the second communication phase,
wherein the communication control unit is configured to generate the transmit signal according to a frame, in which in addition to a field which indicates a priority of the message, a field for a data type is provided, and the communication control unit is configured to write a value in the field for the data type which indicates which type of information is located in a data field of the frame,
wherein the user stations include a control unit, a sensor, and/or a display device of a motor vehicle,
wherein bus wires are used for electrical signal transmission after coupling in a dominant level or generating recessive levels for a signal in a transmit state, wherein messages are serially transmittable as signals among the user stations via the bus, and wherein if an error occurs during the communication on the bus, an error frame is transmitted, and
wherein the following differing properties are implemented in the bus system having CAN XL, including a frame structure having an identifier and an arbitration according to a carrier sensing multiple access process with collision resolution (CSMA/CR).

15. A method for communication in a serial bus system, the method being implemented by a user station of the bus system, which includes a communication control unit and a transceiver unit, the method comprising:
controlling, using the communication control unit, a communication of the user station with at least one other user station of the bus system; and
transmitting, using the transceiver unit, a transmit signal generated by the communication control unit on a bus of the bus system, for a message which is exchanged between user stations of the bus system, a bit time of a signal transmitted in a first communication phase onto the bus differing from a bit time of a signal transmitted in the second communication phase, the communication control unit generating the transmit signal according to a frame, in which in addition to a field which indicates a priority of the message, a field for a data type is provided, and the communication control unit writing a value in the field for the data type which indicates which type of information is located in a data field of the frame,
wherein the user stations include a control unit, a sensor, and/or a display device of a motor vehicle,
wherein bus wires are used for electrical signal transmission after coupling in a dominant level or generating recessive levels for a signal in a transmit state, wherein messages are serially transmittable as signals among the user stations via the bus, and wherein if an error occurs during the communication on the bus, an error frame is transmitted, and
wherein the following differing properties are implemented in the bus system having CAN XL, including a frame structure having an identifier and an arbitration according to a carrier sensing multiple access process with collision resolution (CSMA/CR).

\* \* \* \* \*